Nov. 19, 1968  M. BLOOM  3,412,045
PLASTIC REACTION PRODUCTS OF A PHOSPHONITRILIC
HALIDE AND A POLYAMINE
Filed Dec. 24, 1959

INVENTOR.
MURRAY BLOOM,
BY John M. Koch
ATTORNEY

United States Patent Office 3,412,045
Patented Nov. 19, 1968

3,412,045
PLASTIC REACTION PRODUCTS OF A PHOSPHO-
NITRILIC HALIDE AND A POLYAMINE
Murray Bloom, Whittier, Calif., assignor to Hughes Aircraft Company, Culver City, Calif., a corporation of Delaware
Continuation-in-part of application Ser. No. 699,537, Nov. 29, 1957. This application Dec. 24, 1959, Ser. No. 861,919
16 Claims. (Cl. 260—2)

ABSTRACT OF THE DISCLOSURE

The disclosure herein provides for the method of mixing phosphonitrilic halide material with aromatic polyamine material and obtaining a heat-resistant plastic by interaction thereof, and the products therefrom.

Figure 1:
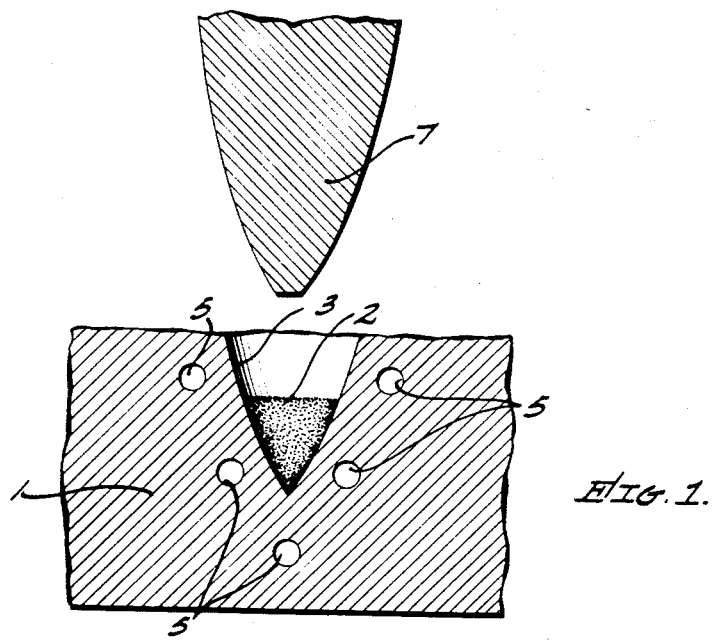

This invention relates to heat resistant polymeric materials, more particularly polymers produced by reacting a polyamine compound with a phosphonitrilic halide, and to a method for forming heat resistant articles from such materials.

This is a continuation-in-part of my copending application, Ser. No. 699,537, filed Nov. 29, 1957, now abandoned.

Conventional plastic materials, such as polystyrene, silicone resins, methylmethacrylate resins, etc., exhibit desirable physical properties, such as high resistance to impact, high electrical resistivity, and ease of fabrication, but lack the important property of being resistant to heat. In fact, conventional plastic materials, although having very desirable characteristics for utilization for many purposes are entirely unsuitable for high temperature applications. When used at high temperatures, conventional plastics melt, char and in some cases burn vigorously.

High temperature conditions are met during the operation of missiles and modern aircraft. Nose cones and other components of missiles and aircraft are required to withstand high temperatures for at least limited periods of time. In addition, certain electrical equipment employing plastic parts, such as terminal strips, sockets, plugs and electron tube bases, for example, also are required to withstand high temperatures. In such applications, even a small amount of charring of the insulator can lead to the formation of an arc which can completely destroy an entire electrical unit.

The heat resistance of a particular conventional plastic material generally can be improved by the addition of a heat resistant filler thereto. For example, polymerized diallyl phthalate when subjected to high temperatures will char and burn. After the addition of titanium dioxide filler thereto, the resulting composition is self-extinguishing and does not support combustion. However, when this composition is exposed directly to an open flame, it chars and fractures. The amount of filler that can be added to a given resin is, of course, limited. If more than this limited amount of filler is added to the resin, its strength is reduced and articles produced therefrom are defective. Consequently, only a limited amount of resistance to high temperatures can be imparted to a plastic or resinous material by the incorporation therein of a filler.

Furthermore, when incorporating a filler in a resinous or plastic material, the particles of the filler tend to agglomerate and form lumps. In actual practice a great deal of care is necessary to produce a uniform dispersion of the filler particles in the plastic mass to prevent lump formation. The production of lumps of non-uniformly dispersed filler in the plastic mass introduces points of stress in the plastic article produced therefrom. The strength of the bonds of attraction between the filler particles is much lower than that of the molecules of the plastic mass.

In addition, when a filler is incorporated in a plastic, the dielectric constant of the resulting plastic composition often is quite different from that of the original plastic material. The dielectric constant of the filler usually differs considerably from that of the original plastic material and causes the composition to have a bulk dielectric constant intermediate those of the two respective components of the composition.

Many conventional polymeric materials suffer from another important disadvantage. Such plastics as the phenolics or silicones, for example, when being molded generate appreciable amounts of volatile by-products. These volatile materials cause undesirable voids or cavities in the bulk of the reaction product and in the finished plastic article. Such voids and cavities are centers of high mechanical stress and may originate fractures. Furthermore, before molding many of the conventional plastic materials, the raw materials to be reacted to produce the polymeric mass are prepared under conditions during which they react, at least partially, and polymerize before being introduced in the mold. Because some polymerization of the starting materials takes place before the molding operation proper commences, difficulty is encountered in completely filling all of the cavities of the mold. This also results in defective molded articles and an undesirably large number of rejects.

Accordingly, it is an important object of my invention to provide resinous or plastic materials which are characterized by exhibiting an extremely high degree of resistance to heat and high temperatures.

Another object of my invention is to provide a reaction mixture which can be introduced directly into a mold for forming a polymeric article and can be prepared in the mold without the occurrence of any appreciable amount of reaction prior to the commencement of the molding operation proper.

A further object is to provide molding materials and a molding method for efficiently forming articles of plastic materials free of voids or cavities and precisely shaped to the contours of the mold.

Additional objects and advantages of the invention will become apparent from the following description, which is given primarily for purposes of illustration, and not limitation.

Briefly stated in general terms, the objects of my invention are attained by providing a plastic material which is highly heat and temperature resistant and moldable by reacting a phosphonitrilic halide having two or more halogens per molecule, preferably the chloride, with a polyamide compound, such as melamine, for example. A powdered phosphonitrilic halide can be mixed with a powdered polyamine compound at room temperatures prior to introduction into a molding die without premature polymerization. The product of the phosphonitrilic halide and the polyamine is a plastic material capable of withstanding considerable heat without charring, burning or fracturing. Also, in accordance with the present invention, it has been found that the product of the reaction between a phosphonitrilic halide and a polyamine, when employed as a filler material in conventional plastics, is not only effective in improving the heat resistance thereof but also actually increases the strength of such plastics.

The plastic materials of my invention are the products of reaction between a phosphonitrilic halide, such as a chloride, bromide, etc., and a polyamine, such as melamine, hexamethylenetetramine, aromatic primary polyamines, such as p-phenylenediamine, etc., preferably having no more than about 13 carbon atoms per molecule. By the term "polyamine" is meant herein amines having more than one amine group in the molecule. Phosphonitrilic chlorides and bromides occur both as cyclic trimers and cyclic tetramers. Either form can be used in practicing the invention. Mixtures of the two forms of the phosphonitrilic halides also can be used. In fact, a suitable mixture containing approximately 25% of the trimer and 75% of the tetramer is commercially available. Mixtures of different phosphonitrilic halides, such as chlorides and bromides, for example, also can be used. In addition, complex phosphonitrilic halides, such as $(PNClBr)_3$, $P_4N_4Cl_2F_6$, etc., can be used. The latter compound can be prepared by heating a mixture of $(PNCl_2)_3$ and $PbF_2$ in an atmosphere of nitrogen. Solid state reaction between the phosphonitrilic halide and the polyamine occurs very slowly, if at all, at temperatures below about 120° C. For this reason, the materials can be readily premixed at room temperature, for example, without polymerization. Inasmuch as it is desirable that the products of the reaction have some predetermined shape, it is preferred to react the materials in a mold under pressure, although it should be understood that pressure is not a requisite condition for the reaction.

The following examples illustrate specific embodiments of the invention.

Example I

Melamine and an equal weight of phosphonitrilic chloride, both in powdered form sufficient to pass through a 100-mesh sieve, are thoroughly mixed. The mixture is heated to a temperature of about 138° C. for about 30 minutes. A solid plastic material is produced having excellent heat resistant properties. The color of the material thus obtained is white.

Example II

Figure 2:
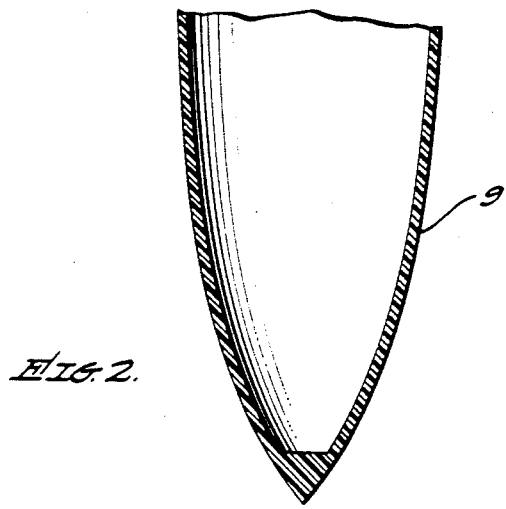

Referring to FIGURE 1, a mixture 2 is prepared according to Example I and is then placed in a two-piece die mold for forming a plastic missile nose cone. The mold consists of a base member 1 of steel containing a mold cavity 3. The base member 1 also is provided with a plurality of conduits 5 through which a heating fluid or vapor, such as steam, is circulated to raise the temperature of the mold. The second member 7 of the mold is shaped and adapted to enter the mold cavity 3 and exert pressure on the contents 2 thereof. Upon heating the mixture 2 to about 138° C. under a mold pressure of 88,000 p.s.i. for about 30 minutes, a hard, white, smooth missile nose cone 9, as shown in FIGURE 2, is produced. The resulting nose cone 9 has the property of high heat and temperature resistance.

Example III

About 4 parts by weight of powdered melamine is mixed with about 1 part by weight of powdered trimeric phosphonitrilic chloride. The particle size of both powdered reactants is sufficiently fine to pass through a 100-mesh sieve. Upon heating the mixture to about 138° C. for about 30 minutes, a solid plastic material is produced having outstandingly superior heat and temperature resistant properties.

Example IV

One part by weight of a mixture of trimeric (25% by weight) and tetrameric (75% by weight) phosphonitrilic chloride is thoroughly mixed with an equal part by weight of melamine and loaded in a die mold of the type described in connection with Example II. Both materials are in powdered form sufficiently fine to pass through a 100-mesh sieve. Upon heating the mixture to about 138° C. under a mold pressure of about 88,000 p.s.i. for about 30 minutes, a hard, white, smooth body of highly heat and temperature resistant plastic material is produced.

Example V

One part by weight of tetrameric phosphonitrilic chloride is mixed with an equal weight of melamine as described in connection with Example IV. The resulting mixture is loaded in the mold and thereupon subjected to about 138° C. at about 88,000 p.s.i. for about 30 minutes. A plastic body substantially identical in hardness, color, and heat resistance to the body produced according to Example IV is obtained.

Example VI

Equal parts by weight of trimeric phosphonitrilic chloride and p-phenylenediamine, a primary aromatic polyamine, both in powdered form sufficiently fine to pass through a 100-mesh sieve, are thoroughly mixed and loaded into a die mold. Under a mold pressure of about 80,000 p.s.i. and a temperature of about 138° C. maintained for about 30 minutes, a hard plastic body resistant to the direct heating of the flame of a Bunsen burner is obtained.

Example VII

One part by weight of trimeric phosphonitrilic chloride is mixed with an equal part of hexamethylenetetramine. Both reactants are in powdered form sufficiently fine to pass through a 100-mesh sieve. Upon heating to about 138° C. for 30 minutes in a die mold under about 80,000 p.s.i., a hard plastic body is produced. While possessing heat resistance superior to that of conventional plastics, such as the silicone resins, the product of this reaction is slightly charred when heated directly in the flames of a Bunsen burner.

Example VIII

Equal parts by weight of trimeric phosphonitrilic chloride and 4,4'-diaminodiphenylmethane, a primary aromatic polyamine, are thoroughly mixed. Both reactants are in the powdered form sufficiently fine to pass through a 100-mesh sieve. Upon heating to about 132° C. in a die mold at about 53,000 p.s.i., a hard plastic body of brownish-yellow color is obtained. Subjecting the body directly to the flame of a Bunsen burner results in a slight surface charring thereof.

Example IX

Equal parts by weight of trimeric phosphonitrilic chloride and o-phenylenediamine, a primary aromatic polyamine, are thoroughly mixed. Both reactants are in the powdered form sufficiently fine to pass a 100-mesh sieve. Upon heating to about 138° C. in a die mold at about 80,000 p.s.i., a hard plastic body is obtained.

Example X

A hard plastic body is produced as described in connection with Example IX, except that m-phenylenediamine, another primary aromatic polyamine, is used instead of o-phenylenediamine.

Example XI

Equal weights of trimeric phosphonitrilic bromide and melamine are powdered and mixed together. The mixture is loaded into a die and heated at 280° F. under a pressure of 88,000 p.s.i. for a half-hour. The die is removed from the press and quenched. The molded plastic article which is removed from the press has a smooth, hard surface and is highly resistant to heat and temperature.

In Examples I, II, and IV to XI, inclusive, equal parts by weight of the polyamine and phosphonitrilic halide were used. However, it may be desirable to produce a plastic body in which either strength or the heat resistance is emphasized. In general, it was noted that the strength of the plastic bodies made according to the invention depends upon the ratio of the phosphonitrilic halide to the polyamine employed in the reaction mixture, and that in mixtures wherein the phosphonitrilic halide constitutes less than about a fourth of the weight thereof, the moldings were relatively low in mechanical strength. Hence it is preferred to employ equal parts by weight of the phosphonitrilic halide and the polyamine. In general, the ratio of phosphonitrilic halide to polyamine in the reaction mixture should not be less than about 1 to about 4.

In practicing the invention by reacting the polyamine and the phosphonitrilic halide in a mold, it is important to maintain the mold temperature substantially below the reaction temperature of the reaction mixture as well as below the melting point of each reactant. If, for example, during the loading of the mold the temperature thereof is at least about 120° C., the reaction will begin to occur during the loading period and difficulty may be encountered in getting all of the cavities of the mold filled with the partly polymerized product thus formed. If, again for example, the mold temperature is high enough to result in melting one of the constituents, that constituent will melt and, under the influence of gravity, separation of the constituents may occur. Hence, it is necessary to maintain the temperature of the mold below the melting point of each of the constituents being loaded and below the reaction temperature of the reaction mixture until the mold is fully readied and loaded for the reaction.

It also is necessary, in carrying out the reaction in a mold, to reduce the volume of the mixture loaded therein to a minimum prior to raising the mold to the temperature at which the reaction occurs. This is because of the high bulk factor of the mixtures described herein. Hence it is preferred to load the mixture into the mold while it is at a temperature described in the preceding paragraph, then apply the full mold pressure to the mold die, and finally raise the mold temperature to the reaction point. By using this method, it is assured that there will be no premature reaction and polymerization, that the constituents will not be aggregated after loading in the mold, that all of the cavities of the mold will be filled, and that there will be substantially no reduction of volume within the mold when the reaction occurs.

The reaction materials employed in the method of the invention are uniquely advantageous since reaction and polymerization prior to introduction into the mold can be prevented. Most other plastic materials or their constituents, suitable for molding, are at least partially polymerized prior to their introduction into the mold. Difficulties, such as failure to fill all the cavities of the mold because of an excessively advanced polymerization, or reaction of raw materials, before being loaded into the mold, are thus avoided by the use of the method of the instant invention since no reaction is initiated until after the materials have been satisfactorily loaded in the mold.

Another advantage of the plastic materials of the invention lies in the absence of volatile by-products in the reactions involved. Conventional resins, such as the phenolics and the silicones, do generate volatile by-products and moldings made thereof are often filled with voids. It is believed that every atom that reacts during the formation of the polymers of the invention remains an integral part of the polymer. It is further believed that the halogen atoms, which are apparently displaced during the formation of phosphorous-nitrogen bonds, are trapped by the formation of ionic bonds to the nitrogen atoms. This feature may thus render polymers produced according to the present invention useful as ion-exchange resins. The plastic moldings made according to the present invention also are much more crystalline than convention resins, as shown by X-ray diffraction data, and it is believed that this high degree of crystallinity is one of the significant factors resulting in the high heat resistance of the plastics of the invention. It is known that other plastics, having a low degree of crystallinity, are much less heat resistant than those which have a greater degree of crystallinity.

The fact that the plastic moldings made according to the present invention do not char is of great importance in the fabrication of electrical terminal strips, sockets and plugs. These pieces of equipment can be rendered useless by even a small amount of charring. Often, a very small amount of charring of the plastic components associated with electrical equipment can lead to the formation of a permanent arc capable of completely destroying the entire piece of equipment. The plastics of the invention not only resist charring, but also tend to suppress arcs however formed.

As indicated heretofore, the plastic materials of the invention can be used as such, as heat resistant plastics, or can be compounded with other conventional plastics as filler materials to impart greater heat and temperature resistance thereto. As fillers, the materials of the invention are superior to conventional mineral fillers because the plastic materials of the invention are chemically bonded together. Mineral fillers such as titanium dioxide and asbestos, for example, are essentially only in the form of particles which have little, if any, bonding action between themselves. In this connection, the polymeric nature of the products of the reaction between phosphonitrilic halides and polyamines are of importance. Also, in the case of mineral fillers, and the like, it is necessary to thoroughly disperse the filler in the resin phase in order to avoid the formation of large clumps of filler which introduce stresses in the plastic body. Ideally, a properly dispersed filler should have each of its particles coated with and surrounded by the resin phase. It will be appreciated that this situation is a difficult one to achieve in actual practice and clumping of mineral fillers is a common occurrence. However, in the case where the plastic materials of the instant invention are employed as fillers, thorough dispersion to avoid clumping is a less critical requirement because the plastic filler materials of the invention not only possess polymeric bonds themselves but also are capable of reacting with the adjacent resin or plastic molecules in which they are dispersed to form polymeric bonds therewith.

The following example illustrates the use of the polymers of my invention as filler material for conventional plastics or resins.

EXAMPLE XII

Equal parts by weight of trimeric phosphonitrilic chloride, melamine, and diallyl phthalate are ground together and then passed through a 100-mesh sieve. After being loaded into a die mold, a pressure of about 80,000 p.s.i. is applied thereto with a temperature of about 138° C. maintained for about 30 minutes. The plastic body thus produced is hard and very resistant to the direct flame of a Bunsen burner.

It should be noted in comparison with these results that the flash point of the diallyl phthalate without any filler is 330° F. In a like manner phenolic resins and silicone resins have had their heat resistance substantially improved by incorporating the product of the invention as a filler therein.

There thus have been described new and useful compositions which may be molded into plastic bodies which have great physical strength and superior resistance to heat. An extremely convenient and advantageous method of molding and forming plastic bodies of the material of the invention has been described. In addition, an important application of the material of the invention as a superior heat and temperature resistant filler for conventional, less heat-resistant plastics has also been described.

Obviously many other modifications and variations of the present invention are possible in the light of the above teachings. It is, therefore, to be understood that within the scope of the appended claims the invention can be practised otherwise than as specifically described.

What is claimed is:

1. The method of producing a solid heat resistant plastic material comprising the steps of mixing a solid phosphonitrilic halide and a solid primary aromatic polyamine having at least two primary amine groups and heating the resulting mixture to a reaction temperature of at least about 120° C.

2. The method of producing a solid heat resistant plastic material comprising the steps of mixing a solid phosphonitrilic halide and a solid primary aromatic polyamine having at least two primary amine groups, wherein the weight ratio of phosphonitrilic halide to polyamine in the mixture is not less than about 1 to about 4, and heating the resulting mixture to a reaction temperature of at least about 120° C.

3. The method of producing a solid heat resistant plastic material comprising the steps of mixing about equal parts by weight of a solid phosphonitrilic halide and a solid primary aromatic polyamine having at least two primary amine groups, and heating the resulting mixture to a reaction temperature of at least about 120° C.

4. The method of producing a solid heat resistant plastic material comprising the steps of mixing solid phosphonitrilic chloride and solid melamine, and heating the resulting solid mixture to a temperature above about 120° C.

5. The method of producing a solid heat resistant plastic material comprising the steps of mixing solid phosphonitrilic chloride and solid hexamethylenetetramine, and heating the resulting solid mixture to a temperature above about 120° C.

6. The method of producing a solid heat resistant plastic material comprising the steps of mixing solid phosphonitrilic chloride and a solid primary aromatic polyamine having no more than about 13 carbon atoms and at least two primary amine groups per molecule, and heating the resulting solid mixture to a temperature above about 120° C.

7. The method of producing a solid heat resistant plastic material comprising the steps of mixing solid phosphonitrilic chloride and solid phenylenediamine, and heating the resulting solid mixture to a temperature above about 120° C.

8. The method of producing a solid heat resistant plastic material comprising the steps of mixing solid phosphonitrilic chloride and solid 4,4'-diaminodiphenylmethane, and heating the resulting solid mixture to a temperature above about 120° C.

9. The heat resistant polymeric reaction product of (1) a phosphonitrilic chloride selected from the group consisting of trimeric phosphonitrilic chloride, tetrameric phosphonitrilic chloride and mixtures thereof and (2) phenylene diamine.

10. The method of providing a heat resistant plastic material comprising the steps of mixing phosphonitrilic halide and an aromatic polyamine having at least two amine groups in the weight ratio of halide to amine material in mixture being not less than about 1 to about 4, heating the mixture to an inter-reaction temperature, and recovering a hard solid plastic.

11. The plastic product produced by the method of claim 10.

12. A solid heat resistant polymeric composition of matter consisting essentially of the product of reaction of a mixture of solid phosphonitrilic halide and solid melamine heated to a reaction temperature of at least about 120° C.

13. A solid heat resistant polymeric composition of matter consisting essentially of the product of reaction of a mixture of solid phosphonitrilic chloride and a solid phenylenediamine heated to a reaction temperature of at least about 120° C.

14. A solid heat resistant polymeric composition of matter consisting essentially of the product of reaction of a mixture of solid phosphonitrilic chloride and solid hexamethylenetetramine heated to a reaction temperature of at least about 120° C.

15. A solid heat resistant polymeric composition of matter consisting essentially of the product of reaction of a mixture of solid phosphonitrilic chloride and solid 4,4'-diaminodiphenylmethane heated to a reaction temperature of at least about 120° C.

16. A solid heat resistant plastic composition of matter consisting essentially of the product of reaction of a mixture of solid phosphonitrilic halide and a solid primary aromatic polyamine having at least two amine groups heated to a temperature of at least about 120° C.

References Cited

UNITED STATES PATENTS

| | | | |
|---|---|---|---|
| 2,109,491 | 3/1938 | Lipkin | 260—2 |
| 2,214,769 | 9/1940 | Lipkin | 260—2 |
| 2,866,773 | 12/1958 | Redfarn | 260—2 |

FOREIGN PATENTS 568,594  4/1945  Great Britain.

OTHER REFERENCES

Bode et al.: Chemische Berichte, vol. 81, pp. 547–552, (1948). Copy in Scientific Library.

WILLIAM H. SHORT, *Primary Examiner.*

H. D. ANDERSON, *Assistant Examiner.*